US011249296B2

(12) United States Patent
Aoyama

(10) Patent No.: US 11,249,296 B2
(45) Date of Patent: Feb. 15, 2022

(54) MICROSCOPE APPARATUS AND OBJECTIVE LENS UNIT

(71) Applicant: NIKON CORPORATION, Tokyo (JP)

(72) Inventor: Kazumasa Aoyama, Tokyo (JP)

(73) Assignee: NIKON CORPORATION, Tokyo (JP)

(*) Notice: Subject to any disclaimer, the term of this patent is extended or adjusted under 35 U.S.C. 154(b) by 308 days.

(21) Appl. No.: 16/383,809

(22) Filed: Apr. 15, 2019

(65) Prior Publication Data

US 2019/0243116 A1   Aug. 8, 2019

Related U.S. Application Data

(63) Continuation of application No. PCT/JP2016/080619, filed on Oct. 14, 2016.

(51) Int. Cl.
| | |
|---|---|
| *G02B 21/00* | (2006.01) |
| *G02B 21/24* | (2006.01) |
| *G02B 21/02* | (2006.01) |
| *G02B 21/06* | (2006.01) |
| *G02B 7/09* | (2021.01) |
| *G02B 21/26* | (2006.01) |
| *G02B 7/04* | (2021.01) |
| *G02B 7/16* | (2021.01) |

(52) U.S. Cl.
CPC .............. *G02B 21/241* (2013.01); *G02B 7/04* (2013.01); *G02B 7/09* (2013.01); *G02B 7/16* (2013.01); *G02B 21/00* (2013.01); *G02B 21/0088* (2013.01); *G02B 21/02* (2013.01); *G02B 21/06* (2013.01); *G02B 21/248* (2013.01); *G02B 21/26* (2013.01)

(58) Field of Classification Search
CPC .... G02B 21/00; G02B 21/0088; G02B 21/02; G02B 21/06; G02B 21/088; G02B 21/24; G02B 21/241; G02B 21/248; G02B 21/26
USPC ................................... 359/368–398
See application file for complete search history.

(56) References Cited

U.S. PATENT DOCUMENTS

| | | | | |
|---|---|---|---|---|
| 4,756,611 | A | * 7/1988 | Yonekubo | G02B 7/16 359/370 |
| 5,270,855 | A | * 12/1993 | Hasegawa | G02B 21/26 359/368 |
| 6,160,662 | A | 12/2000 | Uchida et al. | |
| 6,239,905 | B1 | 5/2001 | Toyoda et al. | |

(Continued)

FOREIGN PATENT DOCUMENTS

| | | |
|---|---|---|
| EP | 2579086 A1 | 4/2013 |
| JP | H07-120825 A | 5/1995 |

(Continued)

OTHER PUBLICATIONS

Jan. 5, 2021 Office Action issued in Japanese Application No. 2018-544668.

(Continued)

*Primary Examiner* — Thong Q Nguyen
(74) *Attorney, Agent, or Firm* — Oliff PLC

(57) ABSTRACT

A microscope apparatus includes a base, a support disposed upright on the base, and an objective lens unit supported by the support and including an objective lens holder that holds an objective lens. The objective lens unit includes a drive source that moves the objective lens holder up and down and a driver that transmits a drive force of the drive source to the objective lens holder.

4 Claims, 10 Drawing Sheets

(56) References Cited

U.S. PATENT DOCUMENTS

| | | | |
|---|---|---|---|
| 8,749,883 B2 * | 6/2014 | Kitahara | G02B 21/0088 |
| | | | 359/391 |
| 2013/0075578 A1 | 3/2013 | Kitahara | |
| 2013/0286474 A1 * | 10/2013 | Kitahara | G02B 21/24 |
| | | | 359/381 |
| 2015/0043061 A1 * | 2/2015 | Cho | G02B 21/02 |
| | | | 359/363 |

FOREIGN PATENT DOCUMENTS

| | | |
|---|---|---|
| JP | H11-038326 A | 2/1999 |
| JP | H11-344675 A | 12/1999 |
| JP | 2014-106291 A | 6/2014 |
| JP | 2014-219690 A | 11/2014 |
| JP | WO2018/070048 A1 | 8/2019 |

OTHER PUBLICATIONS

Apr. 16, 2019 International Preliminary Report on Patentability issued International Patent Application No. PCT/JP2016/080619.
May 26, 2020 Office Action issued in Japanese Patent Application No. 2018-544668.
Jun. 19, 2020 extended Search Report issued in European Patent Application No. 16918557.6.
Cerna Components: Microscope Bodies; CSB1400; ThorLabs; Jun. 22, 2016; XP055700740; 4 pgs.
Jan. 17, 2017 International Search Report issued International Patent Application No. PCT/JP2016/080619.

* cited by examiner

MICROSCOPE APPARATUS AND OBJECTIVE LENS UNIT

CROSS REFERENCE TO RELATED APPLICATION

This is a Continuation of PCT Application No. PCT/JP2016/080619, filed on Oct. 14, 2016. The contents of the above-mentioned application are incorporated herein by reference.

FIELD OF THE INVENTION

The present invention relates to a microscope apparatus and an objective lens unit.

BACKGROUND

As microscope apparatuses that observe a specimen, for example, those typically provided with a base, a pillar mounted on the base, a stage supported by the pillar, and a nosepiece support are known (for example, U.S. Pat. No. 6,239,905). The nosepiece support has a nosepiece on which a plurality of objective lenses can be mounted, and the nosepiece is turned to select an objective lens to be used for observation. The nosepiece support is provided on a focusing device. A driver to move the nosepiece support upward and downward through the focusing device is disposed on the base.

SUMMARY

According to a first aspect of the present invention, provided is a microscope apparatus including a base, a support disposed upright on the base, and an objective lens unit supported by the support and including an objective lens holder that holds an objective lens. The objective lens unit includes a drive source that moves the objective lens holder up and down and a driver that transmits a drive force of the drive source to the objective lens holder.

According to a second aspect of the present invention, provided is an objective lens unit including an attachment and detachment mechanism that is attachable to and detachable from a base of a microscope apparatus, an objective lens holder on which an objective lens is mounted, a drive source that moves the objective lens holder up and down, and a driver that transmits a drive force of the drive source to the objective lens holder. The objective lens unit is mounted to a support disposed upright on the base.

DETAILED DESCRIPTION OF EMBODIMENTS

Figure 1:
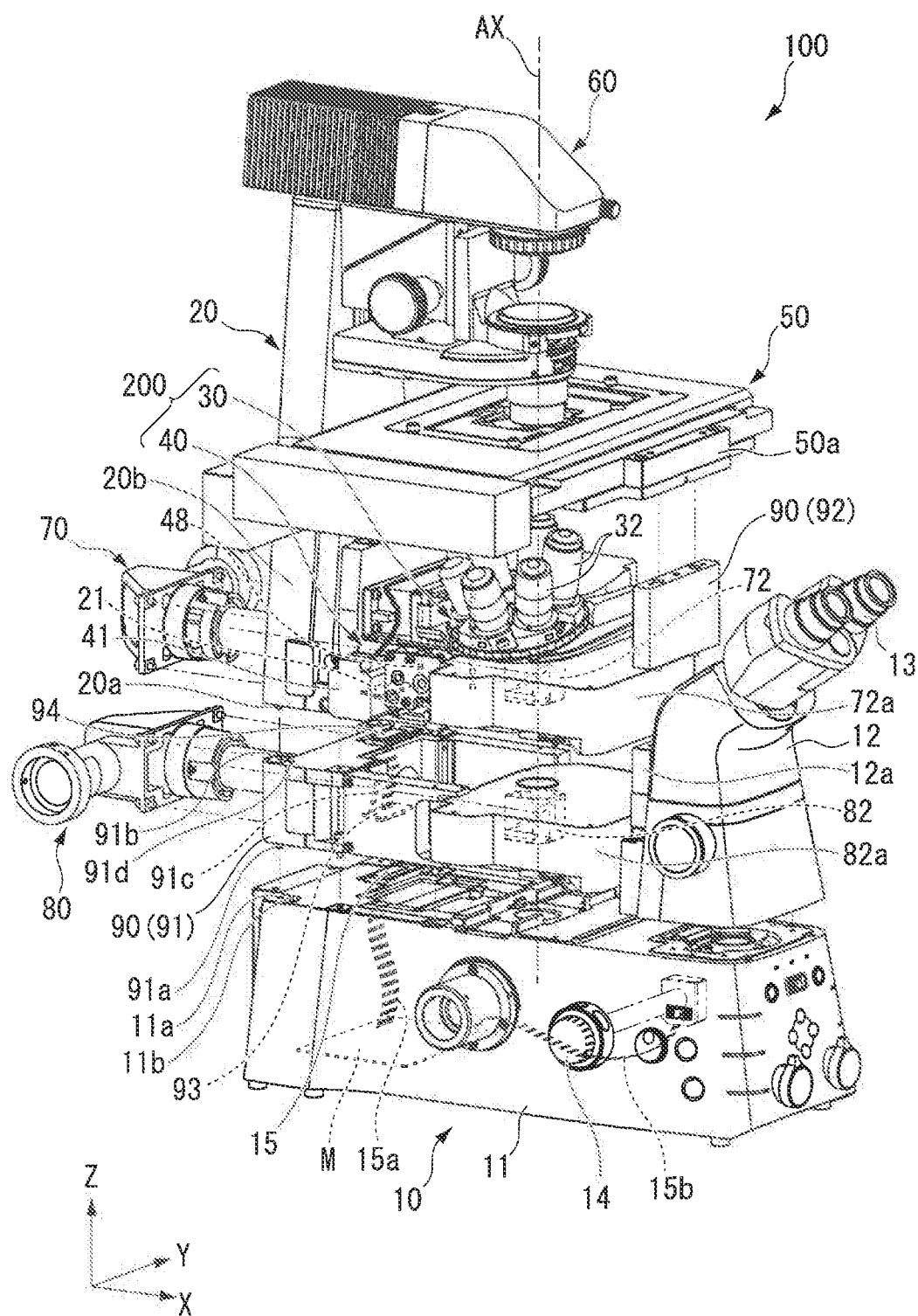
FIG. 1 is an exploded perspective view of a microscope apparatus according to the present embodiment.

In the microscope apparatus disclosed in Patent Literature 1 above, a spacer can be disposed between the base and the pillar in order to adjust the level position of the stage. However, when a spacer is disposed, the distance between the base having the driver thereon and the nosepiece moved by the driver increases. The configuration provided with a spacer thus involves increased shaking in the XY direction (lateral direction) of the nosepiece relative to the base. As a result, the objective lens may be displaced from the desired position, which can affect the accuracy of observation of a specimen.

Embodiments described below provide a microscope apparatus and an objective lens unit with which a specimen can be observed accurately.

Embodiments will be described with reference to the accompanying drawings. It should be noted that the present invention is not limited to the embodiments. The drawings are not to scale as necessary, for example, partially enlarged or enhanced. In the drawings, the directions are illustrated using the XYZ coordinate system as necessary. In each of the X direction, the Y direction, and the Z direction, the direction indicated by an arrow is a positive direction (for example, +X direction) and the opposite direction is a negative direction (for example, −X direction).

Figure 2:
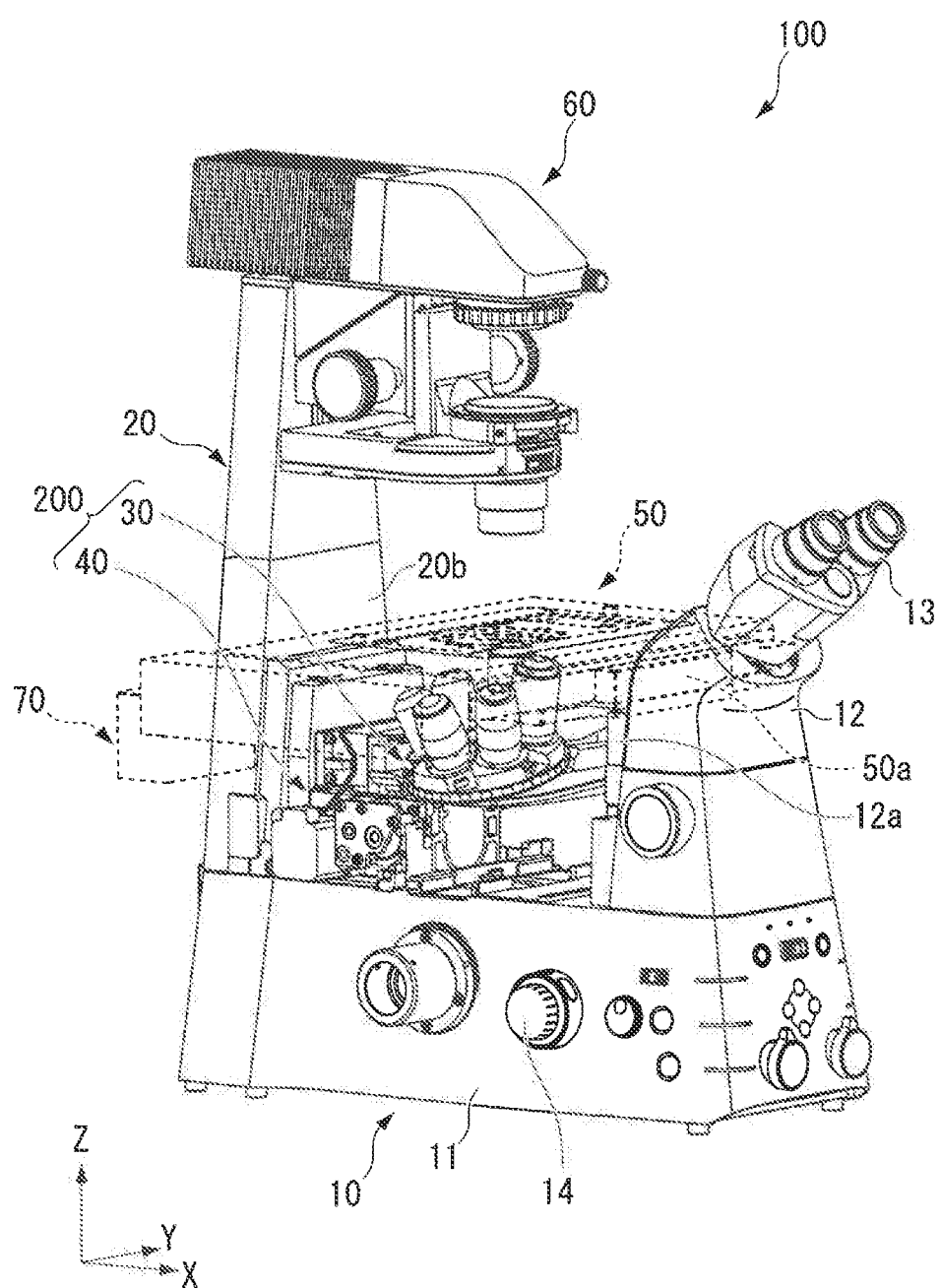
FIG. 2 is a perspective view of an example of the microscope apparatus before a spacer is inserted.

FIG. 1 is an exploded perspective view of an example of a microscope apparatus 100. FIG. 2 is a perspective view of an example of the microscope apparatus 100 with some components removed from the microscope apparatus in FIG. 1. As illustrated in FIG. 1 and FIG. 2, the microscope apparatus 100 is, for example, an inverted microscope. The microscope apparatus 100 includes a base unit 10, a pillar 20, a nosepiece unit 200 (a nosepiece support 30 and a driver 40) that is an objective lens unit, a stage 50, a first illumination system (illumination apparatus) 60, and a second illumination system (illumination apparatus) 70.

The base unit 10 includes a base 11, a tube 12, eyepieces 13, an operation knob 14, and a connector 15. The base 11 is placed on a plane such as a table. Optics, which are not shown in the drawings, such as a reflective mirror, a relay lens, a filter, and a prism are contained in the base 11 and form an optical path of an observation system from the optical axis AX of an objective lens 32 arranged at an observation position to the tube 12. These optics form part of an imaging optical system together with the optics in the tube 12, the eyepieces 13, and objective lenses 32. The tube 12 is detachably provided on the base 11. The tube 12 depicted in FIG. 1 is detached upward from the base 11. The tube 12 contains a variety of optics such as a plurality of lenses, a filter or a prism. These optics form part of the imaging optical system as described above.

The eyepieces 13 are mounted at the top of the tube 12. The eyepieces 13 can be replaced from the tube 12. The eyepieces 13 may have any desired construction. The eyepieces 13 are used for the user to visually confirm an image. Although not shown, instead of the eyepieces 13, an image may be acquired by an imager (image sensor) such as a complementary metal oxide semiconductor (CMOS) or a charge coupled device (CCD). Alternatively, the optical path of the imaging optical system may be partially split so that one may be connected to the eyepieces 13 and the other may be connected to the imager. An image acquired by the imager may be displayed on a display device such as a liquid crystal display or may be captured by a processing device such as a personal computer for image processing.

The operation knob 14 is provided on the base 11. The operation knob 14 is disposed on a side surface of the base 11, for example, so as to be manipulated by hand by the user looking through the eyepieces 13. The operation knob 14 is provided so as to be rotatable to set the amount of drive by the driver 40 in accordance with the rotation position (or the amount of rotation) or to drive or stop an electric drive source 41 of the driver 40. The height of the nosepiece support 30 (the position in the Z direction) thus can be adjusted by manipulating the operation knob 14. The operation knob 14 is not necessarily rotatable. For example, a button may be provided that electrically drives the driver 40 so as to move the nosepiece support 30 upward or downward.

The connector 15 is a terminal formed in an exposed state on the upper surface of the base 11 to enable electrical connection. The connector 15 is disposed at a part connected to the pillar 20. The connector 15 of the base 11 is provided on the rear surface region side on the upper surface of the base 11 or on the upper surface of the base 11 on the back side with respect to the observer side (user side). The rear surface region side on the upper surface of the base 11 or the back side with respect to the observer side on the upper surface of the base 11 is a region on the −X side with respect to the center of the upper surface of the base 11 and including the part to which the connector 15 illustrated in FIG. 1 is provided. Since the connector 15 is thus provided on the rear surface region side on the upper surface of the base 11 or on the back side with respect to the observer side on the upper surface of the base 11, and a base-side connector 93 (described later) connectable to the connector 15 is also provided on a spacer 90 described later, the connector 15 can be disposed based on the mounting position of the spacer 90 (the mounting position where the spacer 90 does not interfere when the spacer 90 is mounted on the microscope apparatus 100). The connector 15 is electrically connected to a board M disposed on the base 11 through a lead wire 15a. The board M is electrically connected to the operation knob 14 through a lead wire 15b. The board M includes, for example, a central processing unit (CPU) or a memory to configure a controller of the components including the driver 40. The board M receives information input by manipulating the operation knob 14 through the lead wire 15b and outputs a signal for controlling the driver 40, electric power for driving the driver 40, and the like to the connector 15 through the lead wire 15a.

The pillar 20 has a pillar lower part (support) 20b disposed upright on the base 11. The pillar lower part 20b is attached to the base 11 with a pillar spacer (spacer 90) 91 interposed therebetween, which will be described later. The pillar 20 (pillar lower part 20b) is disposed to extend upward (+Z direction) from the base 11 (pillar spacer 91). The pillar 20 (pillar lower part 20b) may be attached to the base 11 without the spacer 90. As illustrated in FIG. 2, the pillar 20 (pillar lower part 20b) is attached to the upper surface of the base 11. The lower surface of the pillar 20 (pillar lower part 20b) has a fastening screw 20a screwed into a threaded hole 11a provided on the upper surface of the base 11 or a threaded hole 91b provided on the upper surface of the pillar spacer 91 (see FIG. 1). The upper surface of the base 11 has a pin 11b insertable into a hole (not shown in the drawings) provided on the upper surface of the pillar 20 (pillar lower part 20b) or the lower surface of the pillar spacer 91. The pin 11b is inserted into a hole (not shown in the drawings), whereby the pillar 20 (pillar lower part 20b) is positioned on the base 11. While in this state, the fastening screw 20a is screwed into the threaded hole 11a or the threaded hole 91b, so that the pillar 20 (pillar lower part 20b) is attached to the base 11. The pillar lower part support 20b is a part of an illumination pillar including the first illumination system (illumination apparatus) 60 or is a member that supports an illumination pillar.

The pillar 20 has a connector 21 on its lower surface. When the pillar 20 is directly mounted on the base 11 (the case illustrated in FIG. 2), the connector 21 comes into contact with the connector 15 of the base 11 to be electrically connected to the connector 15. When the pillar 20 is mounted on the base 11 with the pillar spacer 91 interposed therebetween (the case illustrated in FIG. 1), the connector 21 comes into contact with a pillar-side connector 94 described later to be electrically connected to the pillar-side connector 94. As will be described later, in the pillar spacer 91, the pillar-side connector 94 is electrically connected to the connector 15 of the base 11. The pillar 20 thus ensures electrical connection between the connector 21 and the connector 15 of the base 11 even when the pillar spacer 91 is used.

The connector 21 is electrically connected to the drive source of the driver 40, for example, through a lead wire (not shown in the drawings). The connector 21 may be electrically connected to the first illumination system 60 or the stage 50 described later or the like to transmit a signal controlling them or supply electricity for driving. The connectors 15 and 21 described above may have any desired shape that enables electrical connection when the pillar 20 is mounted. For example, when the pillar 20 is mounted, flat surfaces may come into contact with each other to ensure electrical connection. Alternatively, for example, one of the connectors may be shaped like a pin and the other may be shaped like a hole, so that the pin is inserted into the hole to ensure electrical connection when the pillar 20 is mounted.

The nosepiece unit 200 (the nosepiece support 30 and the driver 40) is attached to a side surface on the +X side of the pillar 20 (pillar lower part 20b) and is disposed to extend from the pillar 20 (pillar lower part 20b) in the +X direction. The side surface on the +X side of the pillar 20 is a surface facing the direction in which the eyepieces 13 are installed and corresponds to the observer side during observation. The nosepiece unit 200 therefore is disposed in a space between the pillar 20 and the eyepieces 13 (tube 12) in the X direction. The detail of the nosepiece unit 200 will be described later with reference to other drawings.

The stage 50 is attached to a side surface on the +X side of the pillar 20 (pillar lower part 20b) above the nosepiece unit 200. The stage 50 holds a specimen. The stage 50 has a through hole extending in the up/down direction (the Z direction). A specimen is held by the stage 50 in a state in which the specimen is placed on a transparent plate such as a glass plate or contained in a transparent container such as a glass container. The glass plate or the glass container is held on the stage 50 such that the specimen is disposed in the through hole. The stage 50 may have a jig for holding the glass plate, the glass container, or the like at a predetermined position.

The stage 50 may be movable in the X direction and the Y direction (the horizontal direction or the direction orthogonal to the optical axis AX). The stage 50 may be movable in the up/down direction (the Z direction) or the direction along the optical axis AX. Such movement of the stage 50 may be performed manually by the user or may be performed using a drive source such as an electric motor. When a drive source is used, a control signal as for the amount of movement, etc. and power supply to the drive source may be given from the base 11 through the connector 21 of the pillar 20. An operation knob to operate the movement of the stage 50 may be provided at the base 11.

The first illumination system 60 is attached to the top of the pillar 20. The emission side of the first illumination system 60 is disposed above the stage 50. The first illumination system 60 provides transmitted illumination to the specimen held on the stage 50. The first illumination system 60 includes, for example, a light source emitting white light or visible light (light in a broad range of wavelengths), such as a halogen lamp or a white LED, and an illumination optical system including optics such as a relay lens, a variety of filters, an aperture stop, and a field stop to guide light emitted from the light source. The first illumination system 60 emits illumination light along the optical axis AX. However, embodiments are not limited thereto, and illumination light may be emitted at an angle relative to the optical axis AX.

The illumination light emitted from the first illumination system 60 illuminates the specimen from above (+Z side). The transmitted light (observation light) transmitted through the specimen passes through the optical path in the base 11 and the tube 12 through the objective lenses 32 described later and is guided to the eyepieces 13. The user can look through the eyepieces 13 to observe the specimen held on the stage 50 with illumination light from the first illumination system 60. An imaging device including an imager may be disposed so that the imager receives observation light. The first illumination system 60 does not necessarily include a light source. For example, a light source may be disposed outside the first illumination system 60 to supply illumination light to the first illumination system 60, for example, through an optical fiber. The inclusion of the first illumination system 60 is optional and the first illumination system 60 may be eliminated.

The second illumination system 70 is attached to a side surface on the −X side of the pillar 20 (pillar lower part 20b). The emission side of the second illumination system 70 is disposed below the stage 50 and the nosepiece unit 200. The pillar 20 has a through hole to allow light from the second illumination system 70 to pass through. The second illumination system 70 provides epi-illumination to the specimen held on the stage 50. In addition to epi-illumination, the second illumination system 70 illuminates a fluorescent substance with activation light or excitation light when the microscope apparatus 100 is used as a fluorescence microscope. The second illumination system 70 is interchangeable for epi-illumination or for fluorescent observation.

When the second illumination system 70 provides epi-illumination, the second illumination system 70 includes, for example, a light source that emits white light or visible light (light in a broad range of wavelengths), such as a halogen lamp or a white LED, and an illumination optical system including optics such as a relay lens, a variety of filters, an aperture stop, and a field stop to guide light emitted from the light source. The second illumination system 70 includes a mirror 72. When the second illumination system 70 provides epi-illumination, for example, a semitransparent mirror is used as the mirror 72. The mirror 72 is disposed on the optical axis AX and contained in an optical unit 72a provided under the nosepiece unit 200.

Illumination light emitted from the second illumination system 70 is reflected by the mirror 72 and illuminates a specimen from below (−Z side). The reflected light from the specimen by the illumination light is transmitted through the mirror 72, passes through the optical path in the base 11 and the tube 12 through the objective lenses 32 described later, and is guided to the eyepieces 13. The user can look through the eyepieces 13 to observe the specimen held on the stage 50 with illumination light from the second illumination system 70. The second illumination system 70 does not necessarily include a light source for epi-illumination. For example, a light source may be disposed outside the second illumination system 70 to supply illumination light to the second illumination system 70, for example, through an optical fiber.

When the microscope apparatus 100 is used as a fluorescence microscope, the second illumination system 70 may emit either activation light that activates a fluorescent substance included in a specimen held on the stage 50 or excitation light that excites a fluorescent substance to produce fluorescence. The other one of activation light and excitation light is emitted from a third illumination system 80 described later. The second illumination system 70 includes a laser light source that emits light with wavelengths corresponding to activation light or excitation light and an illumination optical system including optics such as a relay lens, a variety of filters, an aperture stop, and a field stop to guide light emitted from the laser light source.

When the second illumination system 70 emits activation light or excitation light, for example, a dichroic mirror is used as the mirror 72. The dichroic mirror reflects light with wavelengths of activation light or excitation light and transmits wavelengths of fluorescence. For example, when light emitted from the second illumination system 70 is activation light, the activation light is reflected by the mirror 72 and illuminates a specimen from below (−Z side). After emission of activation light or simultaneously with emission of activation light, excitation light is emitted from the third illumination system 80 described later to irradiate a specimen.

The fluorescent substance in a specimen is excited by radiation of activation light and excitation light to emit fluorescence. The fluorescence is transmitted through the mirror 72, passes through the optical path in the base 11 and the tube 12 through the objective lenses 32 described later, and is guided to the eyepieces 13. The user can look through the eyepieces 13 to observe the fluorescence produced from the specimen. Activation light may be emitted from the third illumination system 80 and excitation light may be emitted from the second illumination system 70. The second illumination system 70 may be used, instead of the third illumination system 80, to switch the light source so that activation light and excitation light are emitted from the second illumination system 70 in a switchable manner.

The second illumination system 70 does not necessarily include a light source that emits activation light or excitation light. For example, a light source may be disposed outside the second illumination system 70 to supply activation light or excitation light to the second illumination system 70, for example, through an optical fiber. The inclusion of the second illumination system 70 is optional and the second illumination system 70 may be eliminated.

The microscope apparatus 100 is used with the pillar 20 mounted on the base 11, as illustrated in FIG. 2. However, as described above, when the microscope apparatus 100 is used as a fluorescence microscope or when it is desired that the position of the stage 50 be lifted upward, as illustrated in FIG. 1, the spacer 90 is disposed between the base 11 and the pillar 20. As illustrated in FIG. 2, the pillar 20 is fixed to the upper surface of the base 11 with a fastener (not shown in the drawings) such as a bolt. When the spacer 90 is mounted, the pillar 20 can be removed from the base 11 by removing the fastener.

As illustrated in FIG. 2, a support 12a is provided on the −X side of the tube 12 to support a supported part 50a provided on the +X side of the stage 50. By thus supporting the supported part 50a by the support 12a, shaking or vibration of the stage 50 is suppressed. The support 12a and the supported part 50a are fixed to each other with a fastener (not shown in the drawings) such as a bolt. When the spacer 90 is mounted, the supported part 50a can be detached from the support 12a by removing the fastener.

As illustrated in FIG. 1, a pillar spacer 91 and a stage spacer 92 are used as the spacer 90. The spacer 90 is used when the third illumination system 80 is mounted on the microscope apparatus 100 or when the stage 50 is adjusted upward (+Z direction) relative to the base unit 10, and those spacers have the same size in the Z direction.

The pillar spacer 91 is disposed between the base 11 and the pillar 20. The pillar spacer 91 has a base-side connector 93 and a pillar-side connector 94. The base-side connector 93 is a terminal electrically connected to the connector 15 of the base 11 when the pillar spacer 91 is mounted on the base 11. The pillar-side connector 94 is a terminal electrically connected to the connector 21 of the pillar 20 when the pillar 20 is mounted on the pillar spacer 91.

The pillar spacer 91 has a lead wire 91c that electrically connects the base-side connector 93 with the pillar-side connector 94. Thus, when the pillar spacer 91 is mounted between the base 11 and the pillar 20, the connector 15 is electrically connected with the base-side connector 93 and the pillar-side connector 94 is electrically connected with the connector 21. As a result, a control signal and power supply from the board M is fed to the connector 21 through the base-side connector 93, the lead wire 91c, and the pillar-side connector 94 to enable the control of the driver 40 or other components as described above.

The stage spacer 92 is formed, for example, in a rectangular plate shape. The stage spacer 92 is disposed between the support 12a of the tube 12 and the supported part 50a of the stage 50. The stage spacer 92 is disposed on the +X side of the nosepiece unit 200. The stage spacer 92 can support the supported part 50a to suppress shaking or vibration of the stage 50 even when the pillar spacer 91 is mounted to lift the stage 50 upward.

The pillar spacer 91 has a fastening screw 91a that can be screwed into the threaded hole 11a of the base 11, on its lower surface, and has a threaded hole 91b into which the fastening screw 20a of the pillar 20 can be screwed, on its upper surface. The pin 11b of the base 11 is inserted into a hole (not shown in the drawings) on the lower surface of the pillar spacer 91, whereby the pillar spacer 91 is positioned on the base 11. The upper surface of the pillar spacer 91 further has a pin 91d that can be inserted into a hole (not shown in the drawings) provided on the lower surface of the pillar 20. The pin 91d is inserted into the hole on the lower surface of the pillar 20, whereby the pillar 20 is positioned on the pillar spacer 91. While in this state, the fastening screw 91a is screwed into the threaded hole 11a and the fastening screw 20a is screwed into the threaded hole 91b, whereby the pillar 20 is attached to the base 11 with the pillar spacer 91 interposed therebetween. Although a detailed description is omitted, the stage spacer 92 is also positioned using a pin or a hole.

For example, the stage spacer 92 is fixed to the support 12a of the tube 12, and the stage spacer 92 is fixed to the supported part 50a of the stage 50 with a fastener (not shown in the drawings) such as a fastening screw, in the same manner as the pillar spacer 91 described above.

The nosepiece unit 200, the stage 50, the first illumination system 60, and the second illumination system 70 are attached to the pillar 20. Therefore, when the pillar 20 is removed from the base 11 and when the pillar 20 is attached to the pillar spacer 91, the nosepiece unit 200, the stage 50, the first illumination system 60, and the second illumination system 70 are removed or attached integrally with the pillar 20. The nosepiece unit 200, the stage 50, and the second illumination system 70 are attached to the pillar lower part 20b. Therefore, while holding the nosepiece unit 200, the stage 50, and the second illumination system 70, the pillar lower part 20b is separable from the pillar upper part supporting the first illumination system 60. The base 11 and the objective lens unit (nosepiece unit 200) are separable.

As illustrated in FIG. 1, the third illumination system (illumination apparatus) 80 can be mounted on the pillar spacer 91. The third illumination system 80 is attached to a side surface on the −X side of the pillar spacer 91. The third illumination system 80 is disposed below (−Z side) the second illumination system 70. The pillar spacer 91 has a through hole to allow light from the third illumination system 80 to pass through. When the microscope apparatus 100 is used as a fluorescence microscope, the third illumination system 80 emits either activation light that activates a fluorescent substance included in a specimen held on the stage 50 or excitation light that excites a fluorescent substance to produce fluorescence, as described above.

The third illumination system 80 includes a laser light source that emits light with wavelengths corresponding to activation light or excitation light and an illumination optical system including optics such as a relay lens, a variety of filters, an aperture stop, and a field stop to guide light emitted from the laser light source. The third illumination system 80 includes a mirror 82. When the third illumination system 80 emits activation light or excitation light, for example, a dichroic mirror may be used as the mirror 82, in the same manner as the mirror 72 of the second illumination system 70 described above. The mirror 82 is disposed on the optical axis AX and contained in an optical unit 82a provided under the optical unit 72a including the mirror 72.

For example, when light emitted from the third illumination system 80 is excitation light, the excitation light is reflected by the mirror 82 and then transmitted through the mirror 72 (or the mirror 72 is retreated from the optical axis AX) to irradiate a specimen from below (−Z side). Fluorescence from a fluorescent substance in the specimen is transmitted through the mirror 82, passes through the optical path in the base 11 and the tube 12 through the objective lenses 32 described later, and is guided to the eyepieces 13. The user can look through the eyepieces 13 to observe fluorescence from the specimen, as described above.

The third illumination system 80 may be used, instead of the second illumination system 70, to switch the light source so that activation light and excitation light are emitted from the third illumination system 80 in a switchable manner. The third illumination system 80 does not necessarily include a light source. For example, the light source may be disposed outside the second illumination system 70 to supply white light, activation light, or excitation light to the third illumination system 80, for example, through an optical fiber. Even when the pillar spacer 91 is mounted, the inclusion of the third illumination system 80 is optional and the third illumination system 80 may be eliminated.

The third illumination system 80 may provide epi-illumination to the specimen held on the stage 50. The third illumination system 80 is interchangeable for epi-illumination or for fluorescence observation. When the third illumination system 80 provides epi-illumination, a configuration similar to the second illumination system 70 above is employed. In such case, a semitransparent mirror, for example, is used as the mirror 82.

Figure 3:
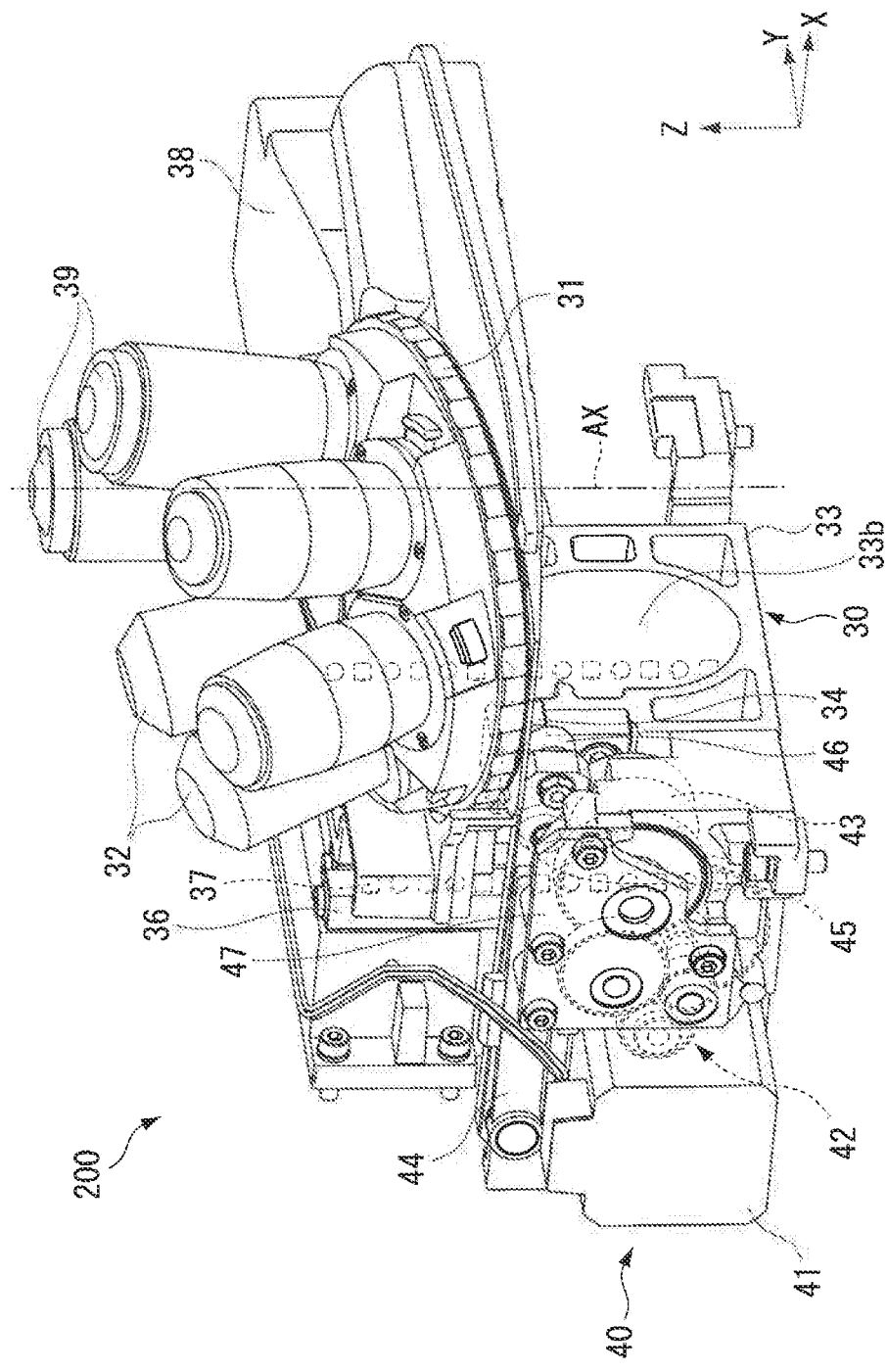
FIG. 3 is a perspective view of an example of an objective lens unit according to the present embodiment.
Figure 4:
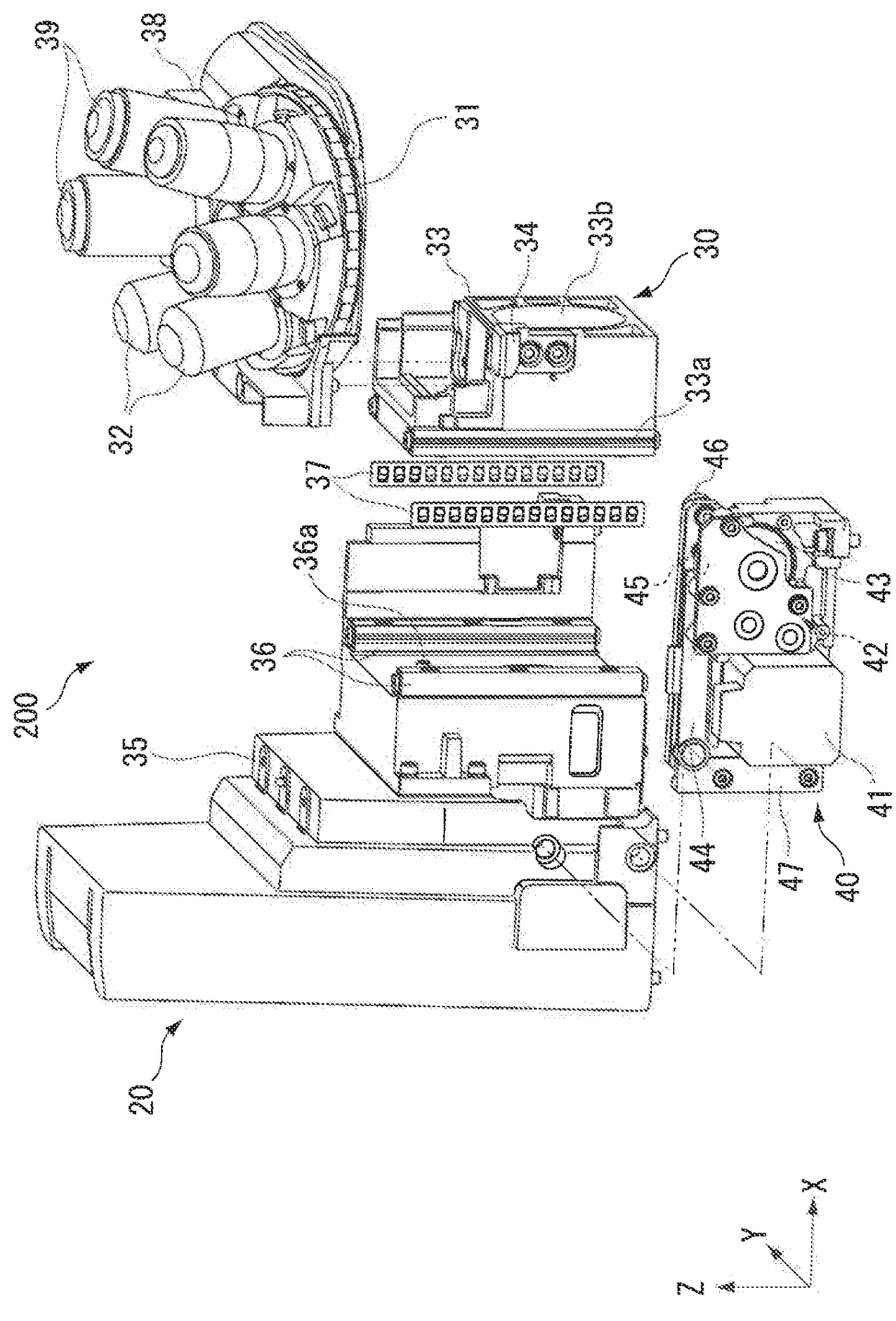
FIG. 4 is an exploded perspective view of the objective lens unit.

The nosepiece unit 200 will now be described. The nosepiece unit 200 is attached to a side surface on the +X side of the pillar 20. FIG. 3 is a perspective view of an example of the nosepiece unit 200 according to an embodiment. FIG. 4 is an exploded perspective view of the nosepiece unit 200. As illustrated in FIG. 3 and FIG. 4, the nosepiece unit 200 includes the nosepiece support 30 and the driver 40.

The nosepiece support 30 supports a nosepiece (objective lens holder) 31. A plurality of objective lenses 32 are mounted on the nosepiece 31. The nosepiece 31 is provided so as to be rotatable, for example, in the direction around the axis at an angle relative to the Z axis. The nosepiece 31 can be turned so that one of the objective lenses 32 is disposed on the optical axis AX (observation position), whereby the objective lenses 32 can be switched. Lenses for aberration correction may be mounted on the nosepiece 31, in addition to the objective lenses 32.

Objective lenses having the function of correcting aberration (aberration correction objective lenses) 39 may be mounted on the nosepiece 31, in addition to the objective lenses 32. Each of the aberration correction objective lenses 39 is, for example, an objective lens including, for example, a lens for correcting chromatic aberration, a lens for correcting spherical aberration, a lens for correcting astigmatism, and a lens for correcting field curvature. The number of lenses installed in one aberration correction objective lens 39 increases as the kinds of aberration to be corrected increase. The aberration correction objective lenses 39 thus have a larger weight than that of the objective lenses 32. One or more aberration correction objective lenses 39 may be mounted on one nosepiece 31.

The nosepiece 31 may be turned manually by the user or may be turned by a drive source such as an electric motor. The drive source is disposed, for example, in the nosepiece support 30. A control signal or power supply to the drive source may be given from the base 11 through the pillar 20, in the same manner as the driver 40 described later. When the nosepiece 31 is turned by an electric motor or the like, the operation knob may be disposed on the base 11 or may be disposed, for example, in a remote control unit at a distance from the microscope apparatus 100. The nosepiece 31 has any desired configuration that holds the turned position and holds the selected objective lens 32 on the optical axis AX.

The nosepiece support 30 includes a nosepiece receptacle 33 and a drive force receiver 34. The nosepiece 31 is mounted on the nosepiece receptacle 33. The nosepiece 31 can be fixed to the nosepiece receptacle 33 with an anchor (not shown in the drawings) such as a bolt and replaced with another nosepiece by removing the bolt. The nosepiece 31 attached to the nosepiece receptacle 33 is kept rotatable. The drive force receiver 34 is attached to a side surface on the −Y side of the nosepiece receptacle 33. The drive force receiver 34 has a protrusion protruding in the −Y direction. The protrusion is a portion receiving a drive force from the driver 40. The nosepiece receptacle 33 has a through hole 33b to allow light from the second illumination system 70 to pass through.

The nosepiece receptacle 33 is held by the pillar 20 with a base 35 and a guide 36 interposed therebetween. The base 35 is attached to a side surface on the +X side of the pillar 20 with an anchor (not shown in the drawings) such as a bolt. The guide 36 is attached to a side surface on the +X side of the base 35 with an anchor (not shown in the drawings) such as a bolt. The +X side of the guide 36 has a shape in which the nosepiece receptacle 33 is partially fitted so that the nosepiece receptacle 33 is guided in the up/down direction (optical axis AX direction). The nosepiece receptacle 33 is held by the pillar 20 so as to be movable in the up/down direction through the guide 36.

Bearings 37 are disposed between the nosepiece receptacle 33 and the guide 36. Two bearings 37 are disposed such that the nosepiece receptacle 33 is sandwiched therebetween in the Y direction. The bearings 37 are formed such that a plurality of roller bearings are arranged in the up/down direction with their orientations alternately changed. Protrusions 33a extending in the up/down direction are provided on the side surfaces on the +Y side and on the −Y side of the nosepiece receptacle 33. The protrusions 33a come into contact with the respective bearings 37 to facilitate the movement of the nosepiece receptacle 33. The bearings 37 guide the protrusions 33a to restrict the movement of the nosepiece receptacle 33 in the X direction.

The nosepiece support 30 is movable in the up/down direction as described above and receives a drive force from the driver 40 described later at the drive force receiver 34 to move in the up/down direction. In other words, the nosepiece support 30 moves in the up/down direction to move the objective lens 32 closer to or away from the stage 50 (see FIG. 1 or FIG. 2). As illustrated in FIG. 4, a screw 36a protruding in the +X direction is provided on a surface on the +X side between two guides 36. The screw 36a is inserted into a slot (not shown in the drawings) in the up/down direction provided on a surface on the −X side of the nosepiece receptacle 33. The movement range (stroke) of the nosepiece support 30 in the up/down direction is set by the screw 36a and the slot. The movement range is set, for example, such that the upper limit is reached before the cam 43 of the driver 40 described later rotates to reach a largest diameter part 43b. Breakage of the driver 40, the nosepiece support 30, and the like is thereby prevented.

The nosepiece support 30 has an autofocus 38 that automatically adjusts the height in the up/down direction (the position in the optical axis AX direction) of the objective lens 32 (nosepiece 31). The autofocus 38 drives the driver 40 described later such that a specimen is arranged at a focus position of the objective lens 32 selected by the nosepiece 31. The autofocus 38 includes, for example, a focus-detecting light source (not shown in the drawings) that emits infrared light for measurement and a sensor (not shown in the drawings) that detects reflected light that is infrared light emitted from the focus-detecting light source and reflected by a specimen or a glass plate. Examples of the kind of the light source include LED light source, LD light source, and laser light source. The autofocus 38 is not essential and may be disposed in the microscope separately from the nosepiece support 30.

The autofocus 38 detects reflected light that is infrared light emitted from the focus-detecting light source and reflected by a specimen with the sensor and drives the driver 40 to move the objective lens 32 along the optical axis AX such that the specimen is arranged at the focus position of the objective lens 32. The autofocus 38 may have any desired configuration and is not limited to the configuration above. A switch indicating whether to operate the autofocus 38 may be disposed on the base 11 or may be disposed, for example, in a remote control unit at a distance from the microscope apparatus 100. Examples of the light source include laser, LED, and laser diode (LD).

As illustrated in FIG. 4, the driver 40 is fixed to the base 35 attached to the pillar 20 with an anchor (not shown in the drawings) such as a bolt. The driver 40 therefore can be replaced by removing the anchor. In the present embodiment, the driver 40 is disposed on the −Y side of the nosepiece support 30. However, embodiments are not limited thereto depending on the configuration of the microscope.

Figure 5:
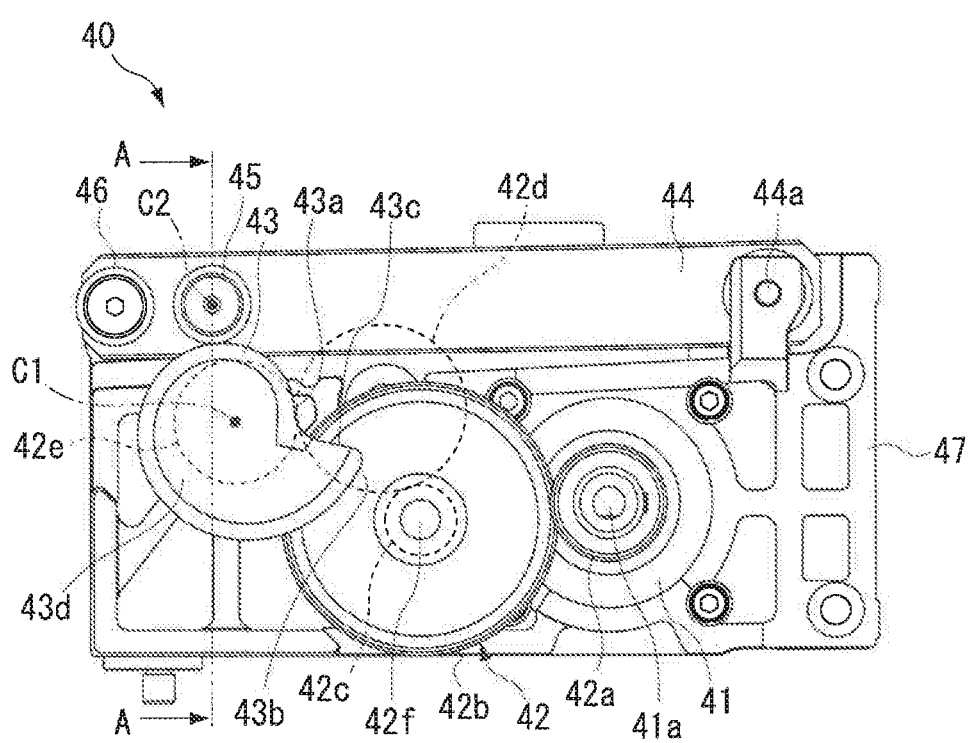
FIG. 5 is a side view of an example of a driver.
Figure 6:
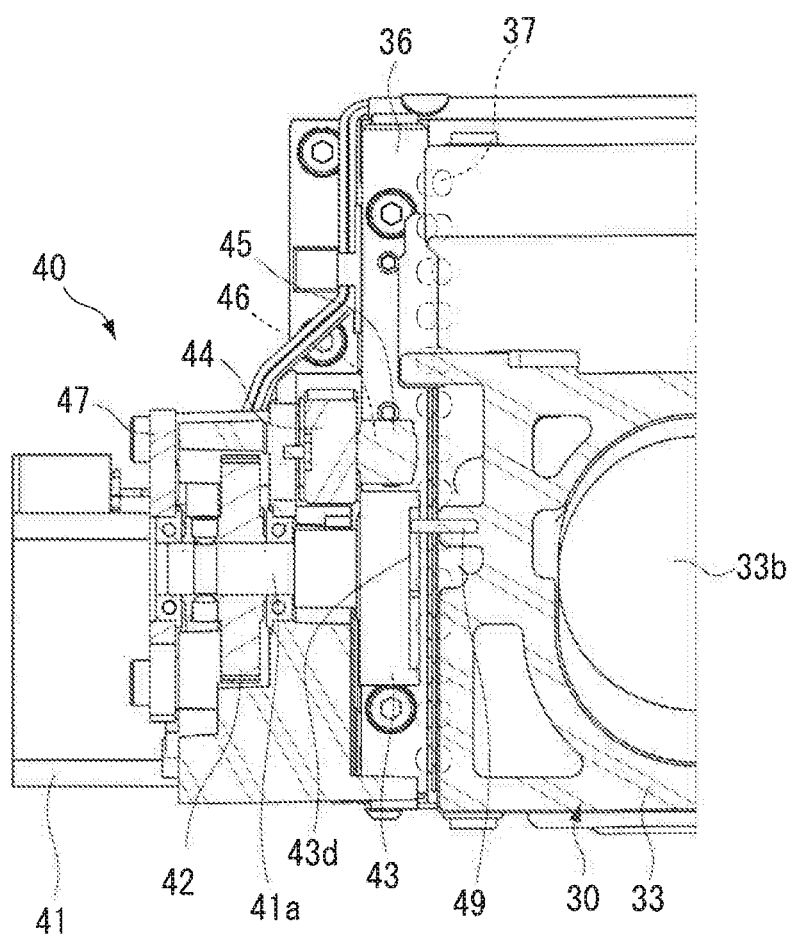
FIG. 6 is a cross-sectional view taken along line A-A in FIG. 5.

FIG. 5 is a side vide view of an example of the driver 40. FIG. 6 is a cross-sectional view taken along line A-A in FIG. 5. As illustrated in FIG. 5 and FIG. 6, the driver 40 includes a drive source 41, a gear train 42, a cam 43, a link rod 44, a cam follower 45, a contact part 46, a frame 47, and a pin 49. The pin 49 is illustrated in FIG. 6.

The drive source 41 is supported by the frame 47. The drive source 41 generates a drive force for moving the nosepiece support 30 in the up/down direction (optical axis AX direction). For example, an electric motor is used as the drive source 41. The drive source 41 is electrically connected to the connector 21 of the pillar 20 (see FIG. 1), for example, through wiring. The drive source 41 is thus electrically connected to the board M (see FIG. 1) disposed inside the base 11. The drive source 41 has an output shaft 41a driven to rotate.

The gear train 42 transmits the drive force generated by the drive source 41 to the cam 43. A plurality of gears included in the gear train 42 are supported by the frame 47 so as to be rotatable about the axis parallel to the Y direction. The gear train 42 uses a plurality of gears for transmission to the cam 43 at a predetermined reduction ratio relative to the output shaft 41a. As illustrated in FIG. 5, the gear train 42 includes an output shaft gear 42a, a first transmission gear 42b, a second transmission gear 42c, a third transmission gear 42d, and a cam rotating gear 42e. The output shaft gear 42a, the first transmission gear 42b, the second transmission gear 42c, the third transmission gear 42d, and the cam rotating gear 42e included in the gear train 42 are successively meshed and supported by the frame 47.

The output shaft gear 42a is fixed to the output shaft 41a and rotates integrally with the output shaft 41a. The first transmission gear 42b and the second transmission gear 42c are fixed to a common shaft 42f. The first transmission gear 42b, the second transmission gear 42c, and the shaft 42f rotate integrally. The first transmission gear 42b has an outer diameter larger than that of the output shaft gear 42a. The second transmission gear 42c has an outer diameter smaller than that of the first transmission gear 42b. The first transmission gear 42b is meshed with the output shaft gear 42a. When the output shaft 41a rotates, the rotation is transmitted from the output shaft gear 42a to the first transmission gear 42b, and the second transmission gear 42c rotates integrally with the rotation of the first transmission gear 42b.

The second transmission gear 42c is meshed with the third transmission gear 42d. The third transmission gear 42d is rotatably supported by a shaft (not shown in the drawings). The third transmission gear 42d has an outer diameter larger than that of the second transmission gear 42c. The third transmission gear 42d rotates as the second transmission gear 42c rotates.

The third transmission gear 42d is meshed with the cam rotating gear 42e. The cam rotating gear 42e is rotatably supported by a shaft (not shown in the drawings). The cam rotating gear 42e has a diameter smaller than that of the third transmission gear 42d. The cam rotating gear 42e is fixed to the cam 43 and rotates integrally with the cam 43.

The cam 43 is rotatably supported on the frame 47 by a shaft (not shown in the drawings) supporting the cam rotating gear 42e. The cam 43 can thus rotate about the Y-axis. With the rotation of the output shaft 41a described above, the cam 43 rotates at a predetermined reduction ratio through the gear train 42. The reduction ratio is adjusted by the outer diameter (the number of teeth) of each gear included in the gear train 42 or the number of gears to be used. For example, when the output shaft 41a rotates at a few thousands of revolutions per minute, the reduction ratio is set such that the cam 43 rotates at a few to a few tens of revolutions per minute.

The cam 43 has a distance (radius) from the rotation center C1 gradually increasing about the Y-axis from a smallest diameter part 43a to a largest diameter part 43b. A step 43c is formed between the largest diameter part 43b and the smallest diameter part 43a. Although the changing rate of the radius from the smallest diameter part 43a to the largest diameter part 43b is set constant, embodiments are not limited thereto. For example, the changing rate of the radius may be greater in the vicinity of the smallest diameter part 43a or the largest diameter part 43b and may be smaller at an intermediate part.

The link rod 44 is a rod-shaped part and disposed to extend in the X direction above the gear train 42. One end side (proximal end side) in the longitudinal direction of the link rod 44 is supported on the frame 47 by a shaft 44a. The link rod 44 is rotatable around the shaft 44a on the Y-axis. The other end side (distal end side) in the longitudinal direction of the link rod 44 is thus rotatable in the direction in which the drive force receiver 34 of the nosepiece support 30 is moved up and down. The link rod 44 is set such that the length in the X direction is fitted in the frame 47. The link rod 44 is thereby prevented from partially protruding from the driver 40.

The cam follower 45 is attached so as to protrude from the distal end side of the link rod 44 in the Y direction. The cam follower 45 is disposed above (+Z side) the cam 43 and lowers by gravity of the link rod 44 to come into contact with the cam 43. The cam follower 45 is pushed against the peripheral surface of the cam 43 with the rotation of the cam 43, thereby moving in the up/down direction (the Z direction). Since the cam follower 45 is provided integrally with the link rod 44, the cam follower 45 moves in the up/down direction to allow the link rod 44 to rotate around the shaft 44a on the Y-axis. The center C2 of the cam follower 45 is disposed so as to be shifted from the rotation center C1 of the cam 43 in the X direction.

The cam follower 45 is a cylindrical or tubular part and rotatably attached to the link rod 44. Thus, when the cam 43 rotates, the cam follower 45 rotates with the movement of the peripheral surface of the cam 43, so that friction between the cam follower 45 and the cam 43 can be reduced to facilitate the operation of the cam follower 45. The cam follower 45 is not necessarily rotatable and may be a cam follower that does not rotate. The cam follower 45 as illustrated in the drawing may be eliminated, and a part of the link rod 44 (for example, intermediate part) may serve as a part engaged with the cam. In such a case, the rotatable part as illustrated in the drawing is not necessarily employed and, for example, a plate-shaped part may be disposed so as to be fixed to the link rod 44.

The contact part 46 is attached so as to protrude from the distal end side of the link rod 44 in the Y direction. The contact part 46 is disposed at a position in the link rod 44 at a distance from the shaft 44a further than the cam follower 45, that is, closer to the distal end side than the cam follower 45. The contact part 46 is thus disposed in the longitudinal direction of the link rod 44 together with the cam follower 45. The contact part 46 moves in the rotational direction around the shaft 44a of the link rod 44 integrally with the link rod 44 and the cam follower 45.

The contact part 46 is disposed in contact with the drive force receiver 34 of the nosepiece support 30. The contact part 46 receives the weight of the nosepiece support 30 through the drive force receiver 34. The contact part 46 thus moves upward with the rotation of the link rod 44 to apply an upward force to the drive force receiver 34 and move the nosepiece support 30 upward. Since the contact part 46 is disposed closer to the distal end side than the cam follower 45, the amount of movement in the up/down direction of the contact part 46 is larger than that of the cam follower 45. The link rod 44 thus increases the amount of movement of the cam follower 45 to be transmitted to the contact part 46.

The contact part 46 is a cylindrical or tubular part similar to the cam follower 45 and rotatably attached to the link rod 44. When moving upward, the contact part 46 moves on the orbit around the shaft 44a of the link rod 44 as described above. On the other hand, the nosepiece support 30 (drive force receiver 34) moves in the up/down direction (the Z direction). Accordingly, although the contact part 46 and the drive force receiver 34 move in different directions, since the contact part 46 is rotatable, the contact part 46, when moving upward, comes into contact with the drive force receiver 34 while rotating. The friction between the contact part 46 and the drive force receiver 34 can thereby be reduced to facilitate the operation of the contact part 46. The contact part 46 is not necessarily rotatable and may be a contact part that does not rotate. The contact part 46 as illustrated in the drawing may be eliminated and a part (for example, distal end portion) of the link rod 44 may be used as a contact part. The cam follower 45 may serve as the contact part 46. In such a case, the cam follower 45 may be an engagement member that does not rotate as described above.

The frame 47 is formed, for example, in a rectangular plate shape. The frame 47 is attached to the base 35 (see FIG. 4) with an anchor such as a bolt. The frame 47 is thus fixed to the pillar 20 with the base 35 interposed therebetween. The frame 47 is fixed to the pillar 20, whereby the components in the driver 40 are fixed to the pillar 20. Thus, by mounting the frame 47 on the base 35, the components of the driver 40 can be disposed at fixed positions to the pillar 20.

The pin 49 is a rod-shaped part and disposed to extend from the nosepiece receptacle 33 of the nosepiece support 30 to be inserted into a recess 43d formed on a surface on the +Y side of the cam 43. The pin 49 restricts the amount of the nosepiece support 30 lifted during transportation or when the user lifts the nosepiece support 30 by hand. The nosepiece support 30 is thus restricted from moving up to the stroke upper limit and even when it falls from that position, damage (for example, dimple) to the gear train 42 or the cam 43 is prevented.

The rotation of the cam 43 may be restricted by the pin 49. For example, the amount of rotation or the rotation position of the cam 43 may be detected by, for example, a sensor, and the driving of the drive source 41 may be stopped when the cam follower 45 reaches the largest diameter part 43b. A contact-type limit switch may be disposed, which operates at the highest position to which the distal end of the link rod 44 is elevated, and the driving of the drive source 41 may be stopped when the limit switch operates (that is, when the cam follower 45 reaches the largest diameter part 43b). The sensor or the limit switch may be either of the contact type or the non-contact type.

The nosepiece unit 200 can move the nosepiece support 30 (that is, the selected objective lens 32) in the up/down direction by manipulating the operation knob 14 provided on the base 11. For example, the operation knob 14 is used to drive the drive source 41 and rotate the cam 43, whereby the height of the cam follower 45 is determined according to the rotation position of the cam 43, and the height of the contact part 46 is set according to the rotation position of the link rod 44 corresponding to the height of the cam follower 45. The nosepiece support 30 moves in the up/down direction in accordance with the height of the contact part 46 to move the selected objective lens 32 to a desired position along the optical axis AX. In other words, the focus position of the selected objective lens 32 can be adjusted by manipulating the operation knob 14.

Figure 7:
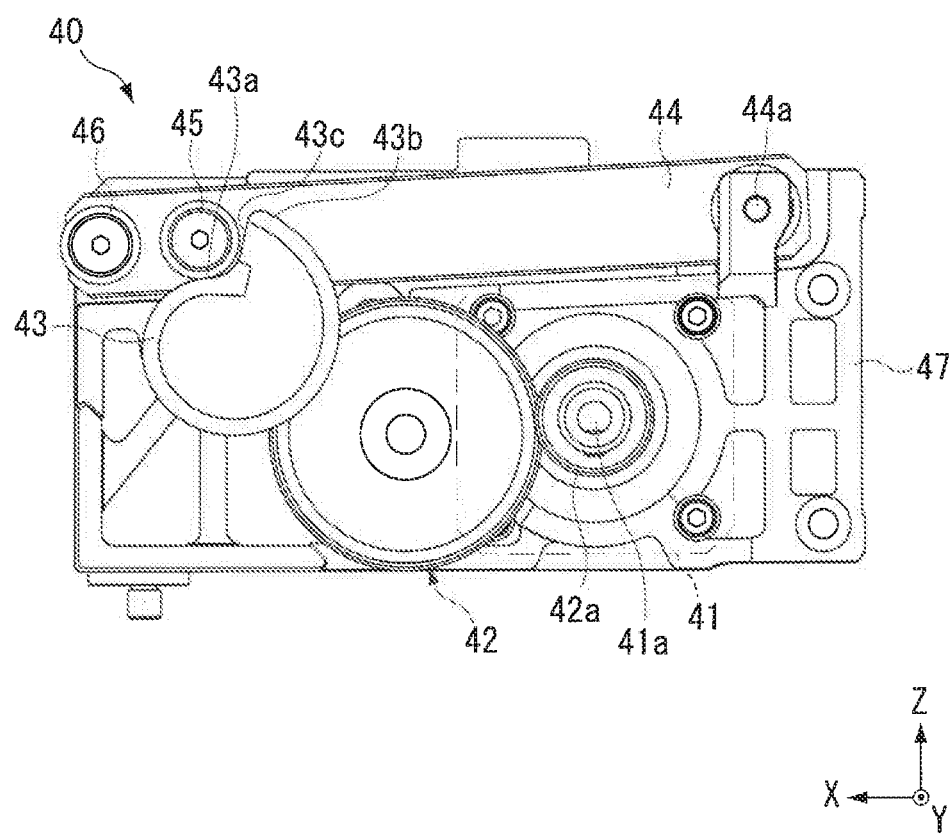
FIG. 7 is a diagram illustrating a link rod in a lowered state.

FIG. 7 is a diagram illustrating an example of the operation of the driver 40 in a state in which the link rod 44 is lowered. FIG. 7 illustrates a state in which the cam follower 45 abuts on the smallest diameter part 43a of the cam 43. In the state illustrated in FIG. 7, the cam follower 45 is in contact with the smallest diameter part 43a of the cam 43. The link rod 44 is thus disposed at a rotation position where the distal end side is moved to the lowest position. Accordingly, the contact part 46 on the distal end side of the link rod 44 is also at the lowest position.

Figure 8:
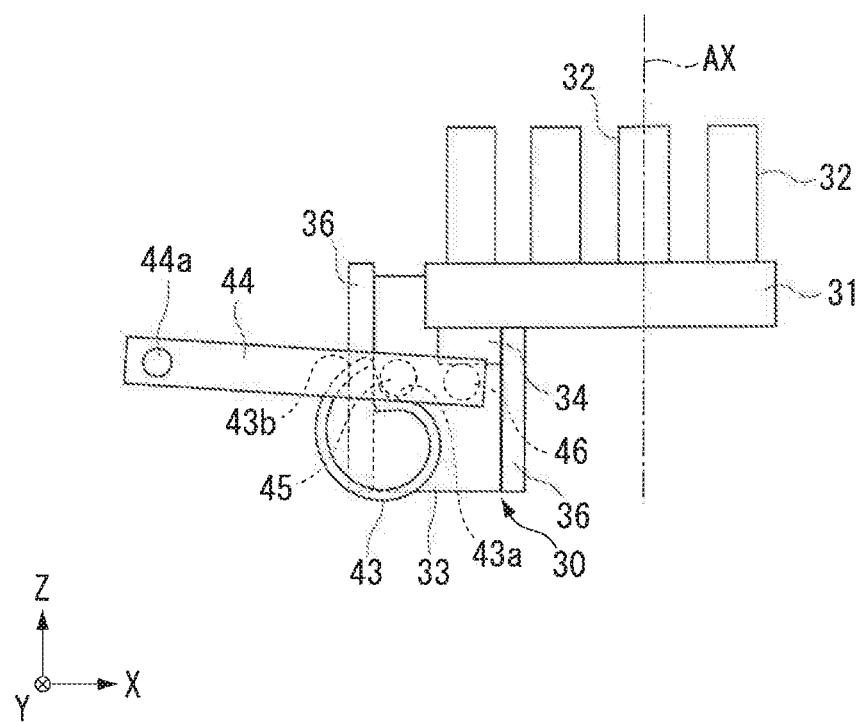
FIG. 8 is a diagram schematically illustrating an example of a nosepiece support lowered.

FIG. 8 is a diagram schematically illustrating an example of the state in which the nosepiece support 30 is lowered. In FIG. 8, the shape or the arrangement of each component is schematically illustrated and some components are not illustrated. FIG. 8 illustrates the position of the nosepiece support 30 when the cam follower 45 is in contact with the smallest diameter part 43a of the cam 43, as illustrated in FIG. 7. As illustrated in FIG. 8, when the cam follower 45 is in contact with the smallest diameter part 43a of the cam 43, the contact part 46 is at the lowest position as described above. The nosepiece support 30 thus lowers to the position supported by the contact part 46 under its own weight and comes into a state of being lowered to the lowest position. In such a state, the objective lens 32 is farthest from the stage 50 (specimen).

When the drive source 41 is driven by manipulating the operation knob 14 from the state illustrated in FIG. 8, the rotation of the output shaft 41a is transmitted to the gear train 42 to rotate the cam 43. The amount of drive of the drive source 41 (the amount of rotation of the cam 43) is preset in accordance with the amount of manipulating the operation knob 14 (for example, the amount of rotation). The rotation direction of the cam 43 is clockwise in FIG. 7 and counterclockwise in FIG. 8. The rotation of the cam 43 also changes the position of the cam follower 45 from the smallest diameter part 43a, and the cam follower 45 moves upward as the outer diameter of the cam 43 gradually increases. When the cam 43 receives a rotational drive force in the direction (the counterclockwise direction in FIG. 7, and the clockwise direction in FIG. 8) opposite to the rotation direction above, the cam follower 45 locks the step 43c to restrict the rotation of the cam 43.

As the cam follower 45 moves up, the distal end side of the link rod 44 also rotates upward, and the contact part 46 moves up. As the contact part 46 moves up, the nosepiece support 30 is subject to an upward force at the drive force receiver 34 and moves up along the guide 36. The selected objective lens 32 thus moves in a direction to approach the stage 50 (specimen) along the optical axis AX.

Figure 9:
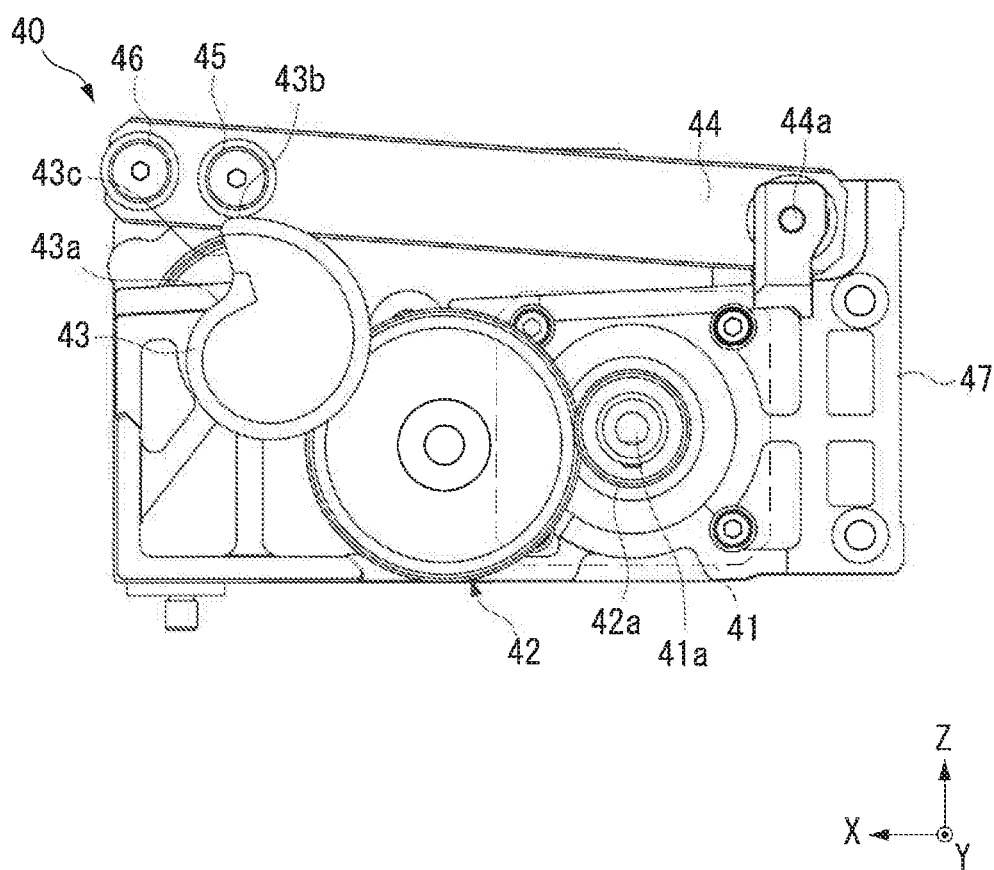
FIG. 9 is a diagram illustrating the link rod in an elevated state.

FIG. 9 is a diagram illustrating an example of the operation of the driver 40 in a state in which the link rod 44 is elevated. FIG. 9 illustrates a state in which the cam follower 45 abuts on the largest diameter part 43b of the cam 43. In the state illustrated in FIG. 9, the cam follower 45 is in contact with the largest diameter part 43b of the cam 43. The link rod 44 is thus disposed at a rotation position where the distal end side is at the highest position. Accordingly, the contact part 46 on the distal end side of the link rod 44 is also at the highest position.

Figure 10:
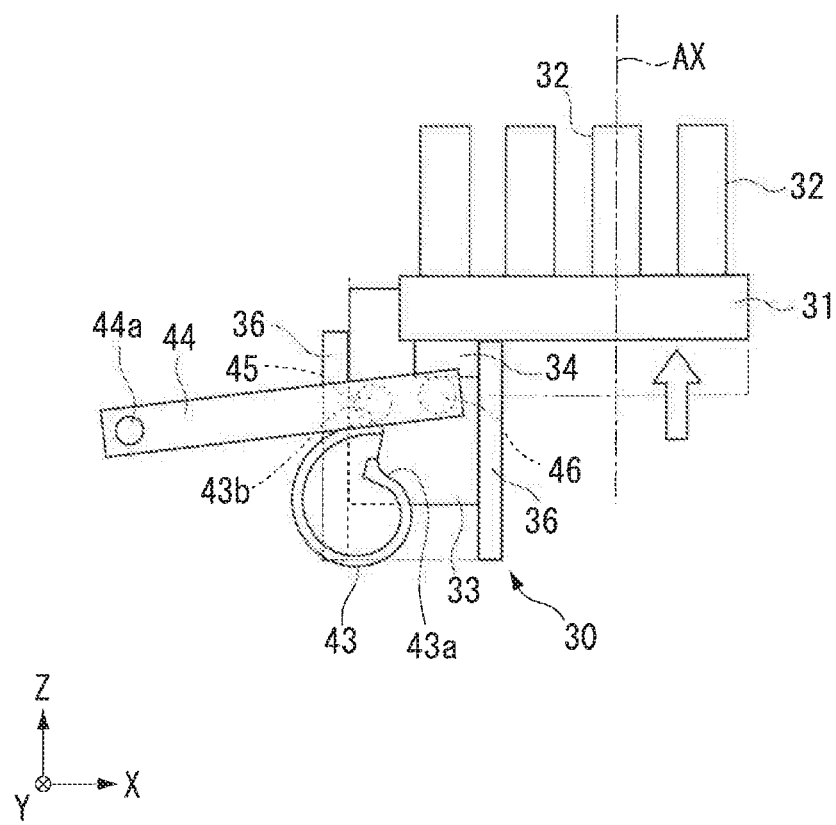
FIG. 10 is a diagram schematically illustrating an example of the nosepiece support elevated.

FIG. 10 is a diagram schematically illustrating an example of the state in which the nosepiece support 30 is elevated. In FIG. 10, as in FIG. 8 described above, the shape or the arrangement of each component is schematically illustrated and some components are not illustrated. FIG. 10 illustrates the position of the nosepiece support 30 when the cam follower 45 is in contact with the largest diameter part 43b of the cam 43, as illustrated in FIG. 9. As illustrated in FIG. 10, when the cam follower 45 is in contact with the largest diameter part 43b of the cam 43, the contact part 46 attains the highest position as described above. The drive force receiver 34 is thus pushed upward by the contact part 46, whereby the nosepiece support 30 comes into a state of being elevated to the highest position. In such a state, the objective lens 32 is closest to the stage 50 (specimen).

Even when the cam 43 is further rotated from the state illustrated in FIG. 9 and FIG. 10, the screw 36a (see FIG. 3) reaches the upper end of the slot of the nosepiece receptacle 33, whereby the upward movement of the nosepiece support 30, that is, the upward movement of the link rod 44 is restricted. As a result, the rotation of the cam 43 beyond the step 43c is restricted, and therefore the nosepiece support 30 temporarily moved up does not suddenly move down. When the nosepiece support 30 is moved down, the contact part 46 is moved down by manipulating the operation knob 14 to rotate the cam 43 in the direction opposite to the direction above (counterclockwise in FIG. 9 and clockwise in FIG. 10). The nosepiece support 30 moves down under its own weight as the contact part 46 moves down.

Thus, the objective lens 32 can be moved along the optical axis AX by manipulating the operation knob 14. For example, the user manipulates the operation knob 14 to move the objective lens 32 while looking through the eyepieces 13 (see FIG. 1 and FIG. 2) so that the objective lens 32 can be disposed at a desired focus position for the specimen. When the autofocus 38 (see FIG. 3 and FIG. 4) is driven, the driver 40 may be driven based on the detection result of the autofocus 38 to adjust the position of the nosepiece support 30 (objective lens 32).

In the present embodiment, as described above, the spacer 90 can be mounted on the microscope apparatus 100 such that the nosepiece support 30 is disposed at a distance from the base 11. However, even when the spacer 90 is mounted, the driver 40 is disposed on the pillar 20 and therefore the distance from the driver 40 to the nosepiece support 30 does not change. That is, in the present embodiment, the distance between the base having the driver thereon and the nosepiece moved by the driver does not increase as in Patent Literature 1. Accordingly, the distance between the base and the nosepiece is the same before and after the spacer is disposed, and the shaking in the lateral direction of the nosepiece relative to the base does not increase. A specimen thus can be observed accurately.

Specifically, for example, in a conventional configuration in which the driver is contained in the base 11, the driver moves the focusing device up and down, and the nosepiece support having the nosepiece mounted thereon is disposed in the focusing device, the spacer is disposed between the nosepiece support and the focusing device. Such a configuration more largely affects shaking in the XY direction due to vibration and, in addition, may more largely affects deformation by thermal expansion of a component in the transmission path due to a change in the ambient temperature, and there arises a possibility that the objective lens 32 is displaced in the XY direction. By contrast, in the present embodiment, even when the spacer 90 is not mounted, the distance between the driver 40 (drive source 41) and the nosepiece support 30 (objective lens 32) is smaller than in the conventional configuration, and the drive source 41, the driver 40, and the nosepiece support 30 are disposed in the pillar lower part 20b. The up/down movement of the nosepiece 31, which is an objective lens holder, can be thus stabilized. In the present embodiment, even when the spacer 90 is mounted, the positional relation between the drive source 41 and the nosepiece support 30 does not change, and the effect by deformation of a component due to a change in the ambient temperature does not change before and after the spacer 90 is disposed, so that variations in the position in the XY direction of the objective lens 32 can be suppressed. In other words, this configuration can prevent a phenomenon in which the focus position of the objective lens 32 is shifted because of the ambient temperature before and after the spacer 90 is disposed. Accordingly, a specimen can be observed accurately.

For example, in a conventional configuration in which the driver is contained in the base 11, when the spacer 90 is mounted, a transmission for drive force to the nosepiece support 30 has to be extended by the amount corresponding to the spacer 90, thereby increasing the transmission path of drive force. Consequently, deformation by thermal expansion of a component in the transmission path due to a change in the ambient temperature or the like may be large, and the objective lens 32 may be displaced. By contrast, in the present embodiment, even when the spacer 90 is mounted, the transmission path of drive force from the drive source 41 to the nosepiece support 30 is short and therefore deformation of a component due to a change in the ambient temperature is small, which suppresses variation in the position of the objective lens 32. In other words, a phenomenon in which the focus position of the objective lens 32 is shifted because of the ambient temperature is less likely to occur. Accordingly, a specimen can be observed accurately.

In the above-noted configuration in which the driver is contained in the base 11, for example, when the spacer 90 is disposed between the nosepiece support 30 and the transmission, the distance between the nosepiece support 30 and the transmission is long when the spacer 90 is mounted. By contrast, in the present embodiment, even when the spacer 90 is mounted or when the spacer 90 is removed, there is no need for changing the positional relation between the transmission and the nosepiece support, and no additional operation for mounting or removing the spacer 90 is necessary, which facilitates the easy handling by the user.

Although embodiments have been described above, the present invention is not limited to the foregoing description, and various modifications can be made without departing from the spirit of the present invention. The configuration of the present embodiment may be partially omitted. For example, although the nosepiece support 30 is moved by one driver 40 in the foregoing embodiment, the present invention is not limited thereto. For example, two or more drivers 40 may be installed in the nosepiece unit 200. In such a case, two or more drivers 40 may be controlled simultaneously, or one driver 40 may be used as a main driver and the other drivers 40 may be used as sub-drivers or backups.

Although the driver 40 uses the gear train 42 to transmit the drive force of the drive source 41 to the cam 43 in the foregoing embodiment, the present invention is not limited thereto. For example, the drive force may be transmitted using a belt or a chain. In such a case, a driving pulley or a driving sprocket may be attached to the output shaft 41*a* of the drive source 41, a driven pulley or a driven sprocket may be attached to the cam 43, and a belt or a chain may be stretched between them. The outer diameter of the pulley or the sprocket is set for each of the driving side and the driven side, whereby the drive force can be transmitted to the cam 43 at a predetermined reduction ratio.

Although the driver 40 allows the cam 43 to rotate the link rod 44 and elevate or lower the contact part 46 in the foregoing embodiment, the present invention is not limited thereto. For example, without the use of the link rod 44, the cam surface of the cam 43 may directly push the drive force receiver 34 of the nosepiece support 30 upward.

Although the driver 40 uses the components such as the gear train 42, the cam 43, and the link rod 44 to transmit the drive force of the drive source 41 to the nosepiece support 30 in the foregoing embodiment, the present invention is not limited thereto. For example, the drive force of the drive source 41 may be transmitted to the nosepiece support 30 using a rack and a pinion gear. For example, the output shaft 41*a* of the drive source 41 is transmitted to a pinion gear, and the pinion gear is meshed with a rod-like rack movable in the up/down direction. The drive source 41 is driven to move the rack in the up/down direction. The upper end of the rack is brought into contact with the lower surface of the drive force receiver 34 of the nosepiece support 30, whereby the nosepiece support 30 can move up and down as the rack moves up and down.

When a rack and a pinion gear are used as the driver 40, for example, the rack may be attached to the nosepiece support 30, and the drive source 41 may be driven to rotate the pinion gear, whereby the nosepiece support 30 integrated with the rack moves up and down. In such a case, the drive source 41 and the pinion gear may be disposed in the nosepiece support 30, and the rack may be disposed, for example, at the frame 47 of the driver 40.

DESCRIPTION OF REFERENCE SIGNS

AX . . . optical axis, 10 . . . base unit, 11 . . . base, 12 . . . tube, 13 . . . eyepiece, 14 . . . operation knob, 15, 21 . . . connector, 20 . . . pillar, 20*b* . . . pillar lower part (support), 30 . . . nosepiece support, 31 . . . nosepiece (objective lens holder), 32 . . . objective lens, 33 . . . nosepiece receptacle, 34 . . . drive force receiver, 36 . . . guide, 40 . . . driver, 41 . . . drive source, 41*a* . . . output shaft, 42 . . . gear train, 43 . . . cam, 43*a* . . . smallest diameter part, 43*b* . . . largest diameter part, 43*c* . . . step part, 44 . . . link rod, 44*a* . . . shaft, 45 . . . cam follower, 46 . . . contact part, 47 . . . frame, 49 . . . pin, 50 . . . stage, 60 . . . first illumination system (illumination apparatus), 70 . . . second illumination system (illumination apparatus), 72, 82 . . . mirror, 80 . . . third illumination system (illumination apparatus), 82*a* . . . optical unit, 90 . . . spacer, 91 . . . pillar spacer, 92 . . . stage spacer, 93 . . . base-side connector, 94 . . . pillar-side connector, 100 . . . microscope apparatus, 200 . . . nosepiece unit (objective lens unit)

What is claimed is:

1. A microscope apparatus comprising:
a base;
a support disposed upright on the base and supporting a stage on which a specimen is disposed, the stage being attached directly to a side surface of the support; and
an objective lens unit supported by the support by being attached directly to the side surface of the support, the objective lens unit including an objective lens holder that holds an objective lens, a drive source that moves the objective lens holder up and down, and a driver that transmits a drive force of the drive source to the objective lens holder, wherein
the objective lens unit is disposed below the stage and attached to the side surface of the support at a first position closer to the base than a second position at which the stage is attached to the side surface of the support,
a first illumination system that provides transmitted illumination is disposed above the stage and attached to the support,
the support with the objective lens unit and the first illumination system attached are integrally detachable from the base, and
a second illumination system and a third illumination system, which are mutually different, are disposed between the objective lens unit and the base.

2. The microscope apparatus according to claim 1, wherein
the microscope apparatus is an inverted microscope,
the second illumination system and the third illumination system are layered between the objective lens unit and the base, and
one of the second illumination system and the third illumination system which is closer to the base is disposed between the base and the support via a spacer.

3. The microscope apparatus according to claim 1, wherein
the base and the objective lens unit are configured to separate,
a spacer is provided which is disposed between the base and the support,
the support is disposed on the base with the spacer interposed therebetween, and
the spacer includes a connector to supply electric power to the driver of the objective lens unit via the base and the support.

4. The microscope apparatus according to claim 3, wherein the base has a connector disposed on an upper surface of the base on a back side with respect to an observer side.

* * * * *